(12) United States Patent
Yamashiro et al.

(10) Patent No.: US 12,338,156 B2
(45) Date of Patent: Jun. 24, 2025

(54) METHOD FOR MANUFACTURING STRIP-SHAPED GLASS FILM

(71) Applicant: Nippon Electric Glass Co., Ltd., Shiga (JP)

(72) Inventors: Riku Yamashiro, Shiga (JP); Koichi Mori, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 322 days.

(21) Appl. No.: 17/791,951

(22) PCT Filed: Mar. 4, 2021

(86) PCT No.: PCT/JP2021/008504
§ 371 (c)(1),
(2) Date: Jul. 11, 2022

(87) PCT Pub. No.: WO2021/187144
PCT Pub. Date: Sep. 23, 2021

(65) Prior Publication Data
US 2023/0047969 A1    Feb. 16, 2023

(30) Foreign Application Priority Data
Mar. 17, 2020   (JP) ................ 2020-046385

(51) Int. Cl.
C03B 17/06    (2006.01)
C03B 35/16    (2006.01)

(52) U.S. Cl.
CPC .............. *C03B 17/06* (2013.01); *C03B 35/16* (2013.01)

(58) Field of Classification Search
None
See application file for complete search history.

(56) References Cited

U.S. PATENT DOCUMENTS 6,502,423 B1 * 1/2003 Ostendarp ............. C03B 17/068
65/176
2012/0090357 A1    4/2012 Nakamura et al.
(Continued)

FOREIGN PATENT DOCUMENTS

JP    2012-87004    5/2012
JP    2015-44709    3/2015
(Continued)

OTHER PUBLICATIONS

International Preliminary Report on Patentability issued Sep. 20, 2022 in corresponding International Patent Application No. PCT/JP2021/008504.
(Continued)

*Primary Examiner* — Lisa L Herring
(74) *Attorney, Agent, or Firm* — Wenderoth, Lind & Ponack, L.L.P.

(57) ABSTRACT

A position of a band-shaped glass film (1) conveyed downward in a vertical direction is detected by a detection unit (21), and the conveyance speed of each of a plurality of conveyance devices (10, 11, 12, and 14) provided in a horizontal conveyance path (R2) is controlled based on detection data in the detection unit (21). Under a condition that, of the plurality of conveyance devices (10, 11, 12, and 14), the conveyance device (10) located on a most upstream side is defined as an upstream side conveyance device, and the conveyance devices (11, 12, and 14) on a downstream side of the upstream side conveyance device (10) are defined as downstream side conveyance devices, an upper limit and a lower limit are set to the conveyance speed of each of the downstream side conveyance devices (11, 12, and 14).

6 Claims, 5 Drawing Sheets

(56) References Cited

U.S. PATENT DOCUMENTS

| | | |
|---|---|---|
| 2013/0129987 A1 | 5/2013 | Mitsugi et al. |
| 2014/0130649 A1 | 5/2014 | Chang et al. |
| 2015/0099618 A1* | 4/2015 | Bisson ................ C03B 17/061 |
| | | 65/25.2 |
| 2017/0197864 A1* | 7/2017 | Aburada ............ B65H 23/1888 |
| 2018/0134605 A1* | 5/2018 | Aburada ............. C03B 33/0235 |
| 2019/0218132 A1 | 7/2019 | Mori et al. |
| 2021/0130217 A1 | 5/2021 | Mori et al. |

FOREIGN PATENT DOCUMENTS

| | | |
|---|---|---|
| JP | 2015-44710 | 3/2015 |
| JP | 2015-174744 | 10/2015 |
| JP | 2016-503379 | 2/2016 |
| JP | 2018-62430 | 4/2018 |
| JP | 2018-522800 | 8/2018 |
| WO | 2013/002210 | 1/2013 |
| WO | 2019/244653 | 12/2019 |

OTHER PUBLICATIONS

International Search Report issued May 25, 2021 in corresponding International Application No. PCT/JP2021/008504.

* cited by examiner

METHOD FOR MANUFACTURING STRIP-SHAPED GLASS FILM

TECHNICAL FIELD

The present invention relates to a method of manufacturing a band-shaped glass film.

BACKGROUND ART

A small thickness and a small weight are demanded for mobile terminals such as smartphones and tablet PCs. Thus, in the current condition, there is an increasing demand for reduction in thickness of glass substrates to be incorporated into those terminals. Under such current condition, a glass film which is a glass substrate reduced in thickness as small as that of a film (for example, thickness equal to or smaller than 300 μm) is now developed and manufactured.

Incidentally, steps of manufacturing a glass film generally include a step of manufacturing a band-shaped glass film that is a base of the glass film. In Patent Literature 1, there is disclosed an example of a method of manufacturing a band-shaped glass film through use of a down-draw method as represented by, for example, an overflow down-draw method, a re-draw method, and a slot down-draw method.

The method disclosed in Patent Literature 1 includes a forming step, a conveyance direction changing step, a horizontal conveyance step, a cutting and removing step, and a roll-up step. In the forming step, a band-shaped glass film is formed while being drawn downward in a vertical direction through use of a forming device. In the conveyance direction changing step, through use of a roller conveyor arranged below the forming device in the vertical direction, the band-shaped glass film having been formed is conveyed along a curved conveyance path, thereby changing the conveyance direction from a vertically downward direction to a horizontal direction. In the horizontal conveyance step, the band-shaped glass film having been changed in conveyance direction is conveyed in the horizontal direction along a horizontal conveyance path. In the cutting and removing step, through use of a laser cutting device, non-effective parts, which are present at both ends in a width direction, are cut and removed from the band-shaped glass film being conveyed in the horizontal direction. In the roll-up step, the band-shaped glass film having the non-effective parts cut and removed therefrom is rolled up by a roll-up device to be formed into a glass roll.

CITATION LIST

Patent Literature 1: JP 2015-44709 A

SUMMARY OF INVENTION

Technical Problem

Incidentally, in the forming step for the band-shaped glass film, the band-shaped glass film is drawn downward in the vertical direction. However, due to variations in glass supply amount and the like, it is difficult to always stabilize the passing position of the drawn band-shaped glass film, and the drawn band-shaped glass film may be displaced to a slack side or a tension side in many cases. When this displacement is left unaddressed, excessive tension and slack occur in the band-shaped glass film in the subsequent horizontal conveyance step. Because of this, the conveyance stability of the band-shaped glass film is impaired, and there is a risk in that defects such as damage to the band-shaped glass film or a decrease in operation stability in the subsequent step may be caused.

In addition, there are assumed various modes (for example, form, degree, and range) when the band-shaped glass film drawn downward in the vertical direction is displaced, and hence it is difficult to ensure the conveyance stability of the band-shaped glass film with respect to all the modes.

The present invention has been made in view of the circumstances described above, and has a technical object to enhance the conveyance stability of the band-shaped glass film.

Solution to Problem

According to one embodiment of the present invention that has been made in order to solve the above-mentioned problem, there is provided a method of manufacturing a band-shaped glass film, comprising: a forming step of forming a band-shaped glass film while drawing the band-shaped glass film downward in a vertical direction; a conveyance direction changing step of changing a conveyance direction of the band-shaped glass film from a vertically downward direction to a horizontal direction by conveying the formed band-shaped glass film along a curved conveyance path; and a horizontal conveyance step of conveying the band-shaped glass film, which has been changed in conveyance direction by the curved conveyance path, in the horizontal direction by a plurality of conveyance devices arranged along a horizontal conveyance path, wherein a state of the band-shaped glass film conveyed downward in the vertical direction is detected by a detection unit, and a conveyance speed of each of the plurality of conveyance devices is controlled based on detection data in the detection unit, and wherein, under a condition that, of the plurality of conveyance devices, the conveyance device located on a most upstream side is defined as an upstream side conveyance device, and the conveyance device on a downstream side of the upstream side conveyance device is defined as a downstream side conveyance device, an upper limit and a lower limit are set to the conveyance speed of the downstream side conveyance device.

When the state of the band-shaped glass film conveyed downward in the vertical direction is detected by the detection unit, and the conveyance speed of each of the plurality of conveyance devices is controlled based on the detection data in the detection unit as described above, each of the conveyance devices can perform conveyance at an appropriate conveyance speed suitable for the state of the band-shaped glass film drawn downward in the vertical direction. Thus, the conveyance stability of the band-shaped glass film can be enhanced. In addition, when the upper limit and the lower limit are set to the conveyance speed of the conveyance device on the downstream side of the upstream side conveyance device on most upstream, even if there is any partial and instantaneous change in state (for example, change in position) in the band-shaped glass film drawn downward in the vertical direction, it is possible to prevent an abrupt change in conveyance speed of the downstream side conveyance device caused by such change in state. Accordingly, the conveyance stability of the band-shaped glass film can be further enhanced, to thereby prevent damage to the band-shaped glass film being conveyed or to enhance the operation stability and the like in other steps (such as cutting and removing step) to be added to the horizontal conveyance step.

In the method of manufacturing a band-shaped glass film, a conveyance speed V1 of the upstream side conveyance device is corrected based on the detection data in the detection unit, and determination is made on whether or not the conveyance speed V1 of the upstream side conveyance device after the correction falls within a specified speed range. When the conveyance speed V1 after the correction falls within the specified speed range, the conveyance speed of the downstream side conveyance device can be corrected based on the conveyance speed V1 after the correction. When the conveyance speed V1 after the correction is out of the specified speed range, the conveyance speed of the downstream side conveyance device can be corrected based on an upper limit value or a lower limit value within the specified speed range.

With this configuration, even when a partial and instantaneous change in state occurs in the band-shaped glass film conveyed downward in the vertical direction, an abrupt change in conveyance speed of the downstream side conveyance device can be suppressed.

From the viewpoint of the conveyance stability of the band-shaped glass film, it is preferred that a ratio X of the upper limit value to the lower limit value (X=upper limit value/lower limit value) within the specified speed range be set to 1.0<X<1.2.

The method of manufacturing a band-shaped glass film can further comprise a cutting and removing step of cutting and removing non-effective parts at both ends in a width direction of the band-shaped glass film by a cutting device. In this case, a second conveyor configured to supply the band-shaped glass film to the cutting device can be provided as the downstream side conveyance device. When the above-mentioned control is performed with respect to the conveyance speed of the second conveyor, the conveyance stability of the band-shaped glass film can be enhanced.

Further, a roll-up device configured to roll up the band-shaped glass film can be provided as the downstream side conveyance device at a terminal end of the horizontal conveyance path. When the band-shaped glass film is rolled up by the roll-up device, a pulling force acts on the band-shaped glass film, and the band-shaped glass film is conveyed. Through control of the conveyance speed of the roll-up device by the above-mentioned process, the conveyance stability of the band-shaped glass film can be enhanced.

In this case, a third conveyor configured to attract and convey the band-shaped glass film can be further provided as the downstream side conveyance device on an upstream side of the roll-up device. Through control of the conveyance speed of the third conveyor by the above-mentioned process, the conveyance stability of the band-shaped glass film can be enhanced.

A plurality of conveyance devices can be provided as the downstream side conveyance devices, and the conveyance speeds of the downstream side conveyance devices can be set so as to be increased toward the conveyance device on a downstream side. With this configuration, the band-shaped glass film is brought into a state of being appropriately tensioned in the horizontal conveyance path, and hence the conveyance stability can be enhanced.

Advantageous Effects of Invention

According to the present invention, the conveyance stability of the band-shaped glass film can be enhanced. Thus, damage caused by fracture or the like of the band-shaped glass film being conveyed can be prevented, or the operation stability in the other steps (for example, the cutting and removing step) to be added to the horizontal conveyance step can be enhanced.

DESCRIPTION OF EMBODIMENTS

Now, with reference to the accompanying drawings, description is made of a method of manufacturing a band-shaped glass film according to an embodiment of the present invention.

Figure 1:
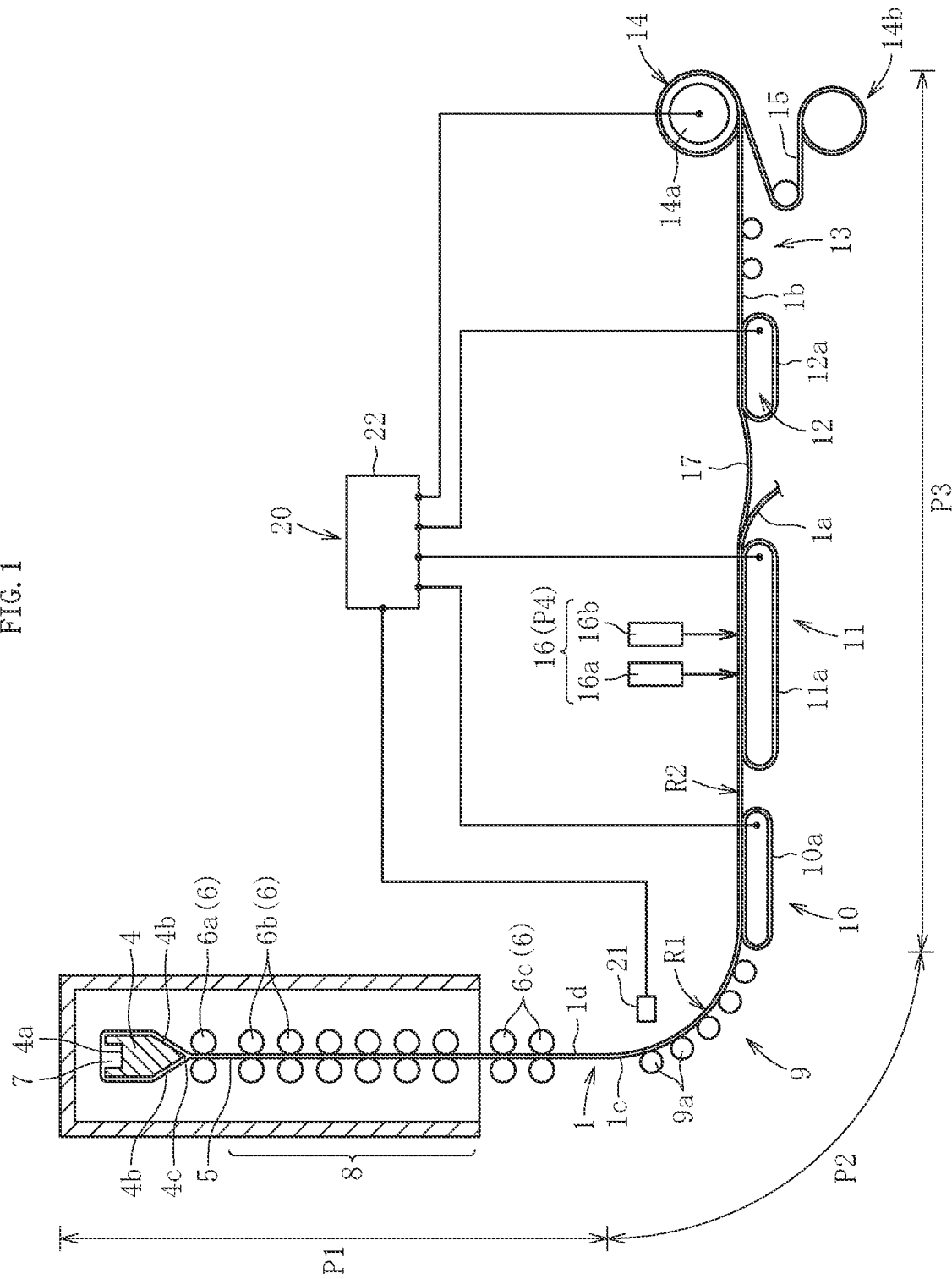
FIG. 1 is a vertical sectional side view for schematically illustrating a method of manufacturing a band-shaped glass film according to an embodiment of the present invention.

As illustrated in FIG. 1, the method of manufacturing a band-shaped glass film according to this embodiment includes a forming step P1, a conveyance direction changing step P2, a horizontal conveyance step P3, and a cutting and removing step P4. In the forming step P1, a band-shaped glass film 1 is formed while being drawn downward in a vertical direction by a down-draw method, for example, an overflow down-draw method. In the conveyance direction changing step P2, a conveyance direction of the band-shaped glass film 1 is changed from a vertically downward direction to a horizontal direction by conveying the band-shaped glass film 1 formed in the forming step P1 along a curved conveyance path R1. In the horizontal conveyance step P3, the band-shaped glass film 1, which has been changed in conveyance direction in the conveyance direction changing step P2, is conveyed in the horizontal direction along a horizontal conveyance path R2. In the cutting and removing step P9, non-effective parts 1a at both ends in a width direction (referring to the width direction of the band-shaped glass film 1) are cut and removed from the band-shaped glass film 1 being conveyed in the horizontal direction in the horizontal conveyance step P3. Now, the detail of each of the steps is described.

[A. Forming Step]

For the forming step P1, there are mainly used a forming trough 4 and roller pairs 6. The forming trough 4 has a wedge shape. The roller pairs 6 are arranged in a plurality of stages along an up-and-down direction, and are capable of sandwiching, from both front and back sides, a glass ribbon 5 flowing down from the forming trough 4.

The forming trough 4 comprises an overflow groove 4a, a pair of side surface portions 4b and 4b, and a lower end portion 4c. The overflow groove 4a is formed in a top portion of the forming trough 4 for allowing a molten glass 7 to flow thereinto. The pair of side surface portions 4b and 4b are configured to allow the molten glass 7 having flowed out from the overflow groove 4a to both sides to flow down. The lower end portion 4c is configured to merge and integrate the molten glass 7 having flowed down along the side surface portions 4b and 4b. The forming trough 4 is capable of continuously producing the glass ribbon 5 from the molten glass 7 having merged and integrated at the lower end portion 4c.

The roller pairs 6 arranged in a plurality of stages along the up-and-down direction comprise a cooling roller pair 6a, annealer roller pairs 6b, and support roller pairs 6c in the state order from an upper stage. The roller pairs 6 are each capable of sandwiching parts of the glass ribbon 5 on one side and another side in a width direction of the glass ribbon 5, which are to be later formed into the non-effective parts 1a of the band-shaped glass film 1.

The cooling roller pair 6a is a roller pair configured to suppress contraction of the glass ribbon 5 in the width direction by sandwiching the glass ribbon 5 directly below the forming trough 4. The annealer roller pairs 6b are each a roller pair configured to guide the glass ribbon 5 downward, which is to be annealed to a temperature equal to or less than a strain point in an annealing furnace 8. The annealer roller pairs 6b sandwich the glass ribbon 5 in some cases, or only restrict rocking of the glass ribbon 5 in the thickness direction without sandwiching the glass ribbon 5 in some cases. The support roller pairs 6c are each a roller pair which is configured to support the glass ribbon 5 having been reduced in temperature to a temperature close to a room temperature in a cooling chamber (not shown) arranged below the annealing furnace 8. Further, the support roller pairs 6c are each configured to determine a speed of pulling down the glass ribbon 5 (drawing speed).

The glass ribbon 5 having passed through the roller pairs 6 which are arranged in a plurality of stages along the up-and-down direction is formed into the band-shaped glass film 1. The band-shaped glass film 1 is formed so as to have a thickness which is sufficient to give flexibility to the band-shaped glass film 1. The band-shaped glass film 1 comprises the effective part 1b and the pair of non-effective parts 1a. The effective part 1b is present at a center in the width direction (direction perpendicular to the drawing sheet of FIG. 1) and later forms a finished product. The pair of non-effective parts 1a are present on outer sides of the effective part 1b in the width direction and are to be removed. The effective part 1b has a thickness of 300 μm or less, preferably 100 μm or less. The non-effective parts 1a comprise edge portions each having a thickness larger than that of the effective part 1b.

In this embodiment, the band-shaped glass film 1 is formed through use of the overflow down-draw method. However, as a matter of course, the band-shaped glass film 1 may be formed through use of other down-draw method, such as a slot down-draw method or a re-draw method.

[B. Conveyance Direction Changing Step]

For the conveyance direction changing step P2, a roller conveyor 9 is used. The roller conveyor 9 is formed of a plurality of rollers 9a arranged in parallel with each other. The roller conveyor 9 conveys the band-shaped glass film 1 along the curved conveyance path R1 while supporting the band-shaped glass film 1 from a back surface 1c side, to thereby change the conveyance direction to the horizontal direction so that a front surface 1d of the band-shaped glass film 1 having passed through the curved conveyance path R1 faces upward.

[C. Horizontal Conveyance Step]

In the horizontal conveyance step P3, the band-shaped glass film 1 is conveyed in the horizontal direction through application of a conveyance force in the horizontal direction. In the horizontal conveyance path R2, a plurality of (three in this embodiment) conveyors 10, 11, and 12 are installed in the stated order from an upstream side in order to apply a conveyance force to the band-shaped glass film 1. Each of the conveyors 10, 11, and 12 is a drive conveyor driven by a drive source (not shown), and in this embodiment, there is illustrated a case in which each of the conveyors 10, 11, and 12 is formed of a belt conveyor as an example. The band-shaped glass film 1 is conveyed in the horizontal direction by driving belts 10a, 11a, and 12a of the respective conveyors 10, 11, and 12 to rotate by the drive sources provided on the individual conveyors 10, 11, and 12. In the following description, the belt conveyor 10 located on most upstream is referred to as "first conveyor". The belt conveyor 11 located on a downstream side of the first conveyor 10 is referred to as "second conveyor". The belt conveyor 12 located on a downstream side of the second conveyor 11 is referred to as "third conveyor".

A fourth conveyor 13 that supports the band-shaped glass film 1 is arranged in the horizontal conveyance path R2 on a downstream side of the third conveyor 12. The fourth conveyor 13 is a driven type that does not apply a conveyance force to the band-shaped glass film 1 and is formed of, for example, a roller conveyor comprising a plurality of rotatably supported rollers. Each of the rollers of the fourth conveyor 13 rotates following the conveyance of the band-shaped glass film 1.)

At a terminal end of the horizontal conveyance path R2, a roll-up device 14 that rolls up the conveyed band-shaped glass film 1 to form a glass roll is installed. The roll-up device 14 includes a roll core 14a and a sheet roll 14b. The band-shaped glass film 1 conveyed from an upstream side is superposed on a protective sheet 15 continuously drawn from the sheet roll 14b and rolled up around the roll core 14a into a roll shape, to thereby obtain a glass roll. When the band-shaped glass film 1 is rolled up by the roll-up device 14, the band-shaped glass film 1 is pulled, and a conveyance force in the horizontal direction is applied to the band-shaped glass film 1.

As described above, each of the belt conveyors 10, 11, and 12 and the roll-up device 14 provided in the horizontal conveyance step P3 functions as a conveyance device that applies a conveyance force to the band-shaped glass film 1.

The first conveyor 10 is capable of jetting a gas (for example, air) with respect to the back surface 1c of the band-shaped glass film 1. The band-shaped glass film 1 is conveyed on the first conveyor 10 under a state in which only a center thereof in the width direction (mainly the effective part 1b) rises. The belt conveyor 10 comprises the belt 10a and a gas jetting device (not shown). The belt 10a has an endless shape, and is configured to convey non-rising portions (mainly the non-effective parts 1a) of the band-shaped glass film 1. The gas jetting device is arranged on an inner peripheral side of the belt 10a, and is configured to jet the gas upward. The belt 10a has a large number of fine through holes (not shown), and the gas having been jetted from the gas jetting device passes through the through holes to reach the back surface 1c of the band-shaped glass film 1.

As the second conveyor 11, an ordinary belt conveyor that does not have a gas (air) jetting function or an attraction function is used. The band-shaped glass film 1 on the second conveyor 11 is in contact with the belt 11a of the second conveyor 11 by its own weight. A cutting device 16 that performs the cutting and removing step P4 described later is arranged on the second conveyor 11. As the second conveyor 11, a roller conveyor that drives a plurality of rollers arranged in parallel to rotate may also be used.

The third conveyor 12 is formed of an attraction conveyor that attracts the band-shaped glass film 1 onto the belt 12a by air suction. A large number of fine through holes (not shown) are formed in the belt 12a of the third conveyor 12. In addition, a negative pressure generating device (not shown) connected to a vacuum pump or the like is arranged on an inner peripheral side of the belt 12a. The negative pressure generating device generates a negative pressure by air suction through the through holes and attracts the band-shaped glass film 1 onto the belt 12a. Owing to this attraction, relative movement does not occur between the belt 12a and the band-shaped glass film 1 during conveyance by the third conveyor 12.

A slack section 17 in which the band-shaped glass film 1 is warped is provided between the second conveyor 11 and the third conveyor 12. The reason for providing the slack section 17 in this manner is as described below. When the slack section 17 is not provided, the tensile force applied to the band-shaped glass film 1 by the roll-up device 14 is propagated to the band-shaped glass film 1 on the second conveyor 11 to be cut by the cutting device 16. As a result, the cutting quality at the time of cutting and removing the non-effective parts 1a in the cutting and removing step P4 deteriorates to cause defects such as fracture of the band-shaped glass film 1.

[D. Cutting and Removing Step]

In the cutting and removing step P4, the non-effective parts 1a are cut and removed from the band-shaped glass film 1 by the cutting device 16 that performs laser cleaving. For the cutting and removing step P4, there are used a laser irradiator 16a and a refrigerant jetting device 16b, which are fixed and installed at certain points above the belt conveyor 14. The laser irradiator 16a is configured to continuously irradiate the band-shaped glass film 1 passing therebelow with a laser light along a boundary between the effective part 1b and each of the non-effective parts 1a. The refrigerant jetting device 16b is configured to continuously jet a refrigerant (for example, mist-like water) with respect to the part of the band-shaped glass film 1 having been irradiated with the laser light.

With this, a thermal stress is generated in the band-shaped glass film 1 due to a temperature difference between the part having been heated by the laser light and the part having been cooled by the refrigerant. Further, due to the thermal stress, a cut part (part at which the effective part 1b and the non-effective part 1a are separated from each other) is continuously formed along the boundary between the effective part 1b and the non-effective part 1a. In such a manner, the band-shaped glass film 1 is continuously cut along a longitudinal direction. In this embodiment, the band-shaped glass film 1 is cut by the laser cutting method. However, the band-shaped glass film 1 may be cut by a laser fusing method.

The band-shaped glass film 1 having the non-effective parts 1a cut and removed therefrom (band-shaped glass film 1 comprising only the effective part 1b) is moved from the second conveyor 11 to the third conveyor 12 through the slack section 17. Meanwhile, the non-effective parts 1a having been removed from the band-shaped glass film 1 are not moved to the third conveyor 12. The non-effective parts 1a are separated downward from the horizontal conveyance path R2 for the band-shaped glass film 1, and are thereafter discarded.

[E. Speed Governor]

Each of the conveyance devices 10, 11, 12, and 14 in the horizontal conveyance step P3 is basically driven in synchronization with the drawing speed by the support roller pairs 6c. Meanwhile, the position of the band-shaped glass film 1 drawn from the support roller pairs 6c may be changed for some reason (for example, variations in supply amount of molten glass). In order to handle this change, the conveyance speed of each of the conveyance devices 10, 11, 12, and 14 is individually controlled by a speed governor 20. The speed governor 20 comprises a detection unit 21 and a control unit 22. The detection unit 21 is configured to detect the state (displacement) of the band-shaped glass film 1 conveyed downward in the vertical direction. The control unit 22 is configured to control the conveyance speed of each of the conveyance devices (first conveyor 10, second conveyor 11, third conveyor 12, and roll-up device 14) based on detection data in the detection unit 21.

The detection unit 21 is arranged on a downstream side of the support roller pairs 6c in the molding step P1 so as to face the band-shaped glass film 1 conveyed downward in the vertical direction. As the detection unit 21, for example, a distance sensor is used. In this embodiment, there is illustrated a case in which the detection unit 21 is arranged at a position facing the roller 9a on most upstream in the curved conveyance path R1.

Figure 2A:
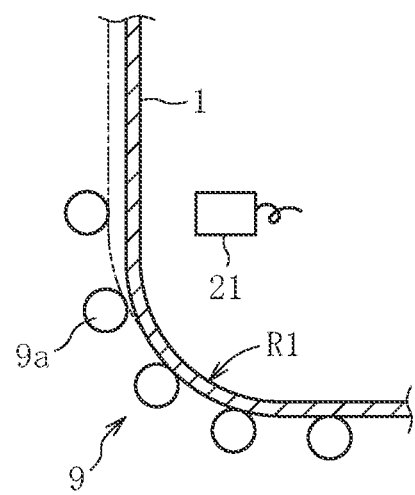
FIG. 2A is a vertical sectional view for schematically illustrating the vicinity of a curved conveyance path in an enlarged manner, and is an illustration of a state in which the band-shaped glass film is displaced to a slack side.
Figure 2B:
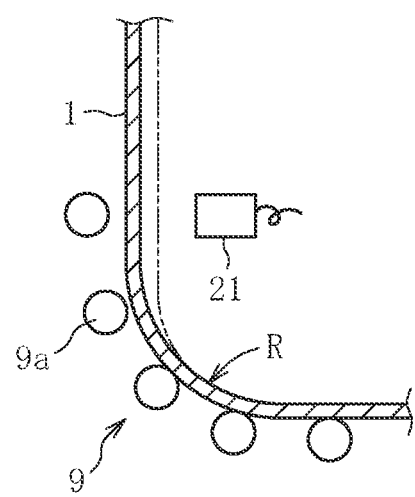
FIG. 2B is a vertical sectional view for schematically illustrating the vicinity of the curved conveyance path in an enlarged manner, and is an illustration of a state in which the band-shaped glass film is displaced to a tension side.

In an upstream portion of the conveyance direction changing step P2, as illustrated in each of FIG. 2A and FIG. 2B, the band-shaped glass film 1 is conveyed downward in the vertical direction in a state of not being in contact with the roller 9a on most upstream. When the band-shaped glass film 1 is brought into contact with the roller 9a on a downstream side of the roller on most upstream, the conveyance direction of the band-shaped glass film 1 is changed from the vertically downward direction to the horizontal direction. In this embodiment, there is illustrated a case in which the detection unit 21 is arranged in the vicinity of the roller 9a on most upstream in the curved conveyance path R1. However, the detection unit 21 may be arranged at a suitable position on an upstream side of the roller 9a that is not in contact with the band-shaped glass film 1 and on a downstream side of the support roller pairs 6c.

The detection unit 21 is connected to an input side of the control unit 22. Meanwhile, an output side of the control unit 22 is connected to the drive source of each of the conveyance devices (first conveyor 10, second conveyor 11, third conveyor 12, and roll-up device 14) in the horizontal conveyance path R2. When predetermined calculation is performed in the control unit 22 based on the detection data in the detection unit 21, the conveyance speed of each of the conveyance devices 10, 11, 12, and 14 is independently controlled.

When the band-shaped glass film 1 having undergone the forming step P1 is conveyed downward in the vertical direction, the position of the band-shaped glass film 1 is changed due to various factors as described above. This change in position appears in such a manner that the entire band-shaped glass film 1 conveyed downward in the vertical direction moves to the slack side as illustrated in FIG. 2A or the entire band-shaped glass film 1 moves to the tension side as illustrated in FIG. 2B.

When the position of the band-shaped glass film 1 is changed as described above, the detection unit 21 detects the displacement of the band-shaped glass film 1, and the control unit 22 that has received the detection signal adjusts the conveyance speed of each of the conveyance devices (first conveyor 10, second conveyor 11, third conveyor 12, and roll-up device 14) to return the displaced band-shaped glass film 1 to a specified position. Specifically, when the band-shaped glass film 1 is displaced to the slack side (indicated by the alternate long and two short dashes line) as illustrated in FIG. 2A, the conveyance speed of each of the conveyance devices (10, 11, 12, and 14) is increased to move the band-shaped glass film 1 to the tension side, to thereby return the band-shaped glass film 1 to the specified position (indicated by the solid line). Meanwhile, when the band-shaped glass film 1 moves to the tension side (alternate long and two short dashes line) as illustrated in FIG. 2B, the conveyance speed of each of the conveyance devices (10, 11, 12, and 14) is decreased to move the band-shaped glass film 1 to the slack side, to thereby return the band-shaped glass film 1 to the specified position indicated by the solid line)

In this case, of the conveyance devices (10, 11, 12, and 14), a conveyance speed V1 of the first conveyor 10 (upstream side conveyance device) located on most upstream is corrected to a speed-increasing side or a speed-decreasing side based on the detection data in the detection unit 21 so that the change in position of the band-shaped glass film 1 is eliminated. In addition, conveyance speeds V2, V3, and Vw of the second conveyor 11, the third conveyor 12, and the roll-up device 14 located on the downstream side of the first conveyor 10 are each corrected to a value obtained by multiplying the corrected conveyance speed V1 of the first conveyor 10 by a unique coefficient $\alpha$ determined for each of the conveyance devices 11, 12, and 14. The coefficient $\alpha$ is determined so that a relationship of $\alpha 2 < \alpha 3 < \alpha w$ is satisfied, where $\alpha 2$ represents the coefficient of the second conveyor, $\alpha 3$ represents the coefficient of the third conveyor, and $\alpha w$ represents the coefficient of the roll-up device 14. From the foregoing, the conveyance speed V2 of the second conveyor 11, the conveyance speed V3 of the third conveyor 12, and the conveyance speed Vw of the roll-up device 14 are corrected so as to satisfy the following:

$V2 = V1 \times \alpha 2$ $V3 = V2 \times \alpha 3$ $Vw = V1 \times \alpha w$ and the conveyance speed is increased toward the conveyance device on a downstream side. When the conveyance speed is increased toward the conveyance device on the downstream side as described above, unintentional slack of the band-shaped glass film 1 in the horizontal conveyance path R2 can be prevented, and the band-shaped glass film can be held in a state of being appropriately tensioned. Incidentally, $\alpha 2$ is about 1.01, $\alpha 3$ is about 1.02, and $\alpha w$ is about 1.05, and hence the differences between the conveyance speeds V1, V2, V3, and Vw of the respective conveyance devices 10, 11, 12, and 14 are slight differences. A slack amount measuring sensor (for example, a laser sensor) (not shown) is provided in the slack section 17. When the slack amount in the slack section 17 is less than a predetermined amount, the control unit 22 may decrease the conveyance speed V3 of the third conveyor 12 to be less than that of the second conveyor 11 until the slack amount becomes more than the predetermined amount. Also in this case, it is preferred that the conveyance speed V3 of the third conveyor 12 be higher than the conveyance speed V1 of the first conveyor 10.

As described above, when a change in position of the band-shaped glass film 1 occurs, the conveyance speed V1 of the first conveyor 10 is corrected based on the detection data in the detection unit 21 so that the change in position of the band-shaped glass film 1 is eliminated. Meanwhile, each of the conveyance speeds (V2, V3, and Vw) of the second conveyor 11, the third conveyor 12, and the roll-up device 14 on the downstream side of the first conveyor 10 is determined in such a manner that the coefficient $\alpha$ is added to the conveyance speed V1 of the first conveyor 10, and further the conveyance speed is gradually increased toward a downstream side.

[F. Problems of Existing Speed Governor and Solutions Thereto]

It has been clarified that the control of each of the conveyance speeds by the existing speed governor 20 described above causes the following defects.

Figure 3A:
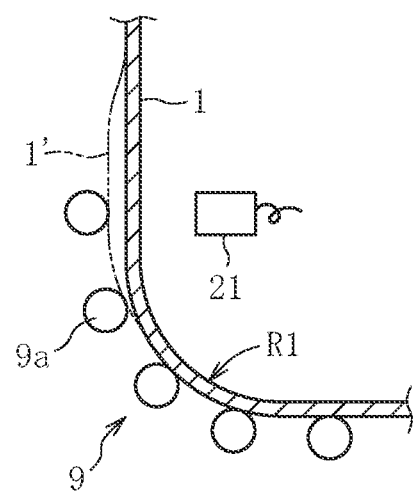
FIG. 3A is a vertical sectional view for schematically illustrating the vicinity of the curved conveyance path in an enlarged manner, and is an illustration of a state in which the band-shaped glass film is partially displaced to the slack side.
Figure 3B:
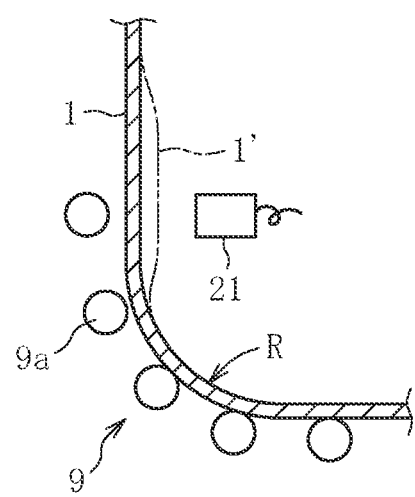
FIG. 3B is a vertical sectional view for schematically illustrating the vicinity of the curved conveyance path in an enlarged manner, and is an illustration of a state in which the band-shaped glass film is partially displaced to the tension side.

When the change in position of the band-shaped glass film 1 illustrated in each of FIG. 2A and FIG. 2B continues for a certain period of time in a wide region (for example, an entire region in the width direction), the band-shaped glass film 1 can be stably conveyed even through control of the conveyance speed by the existing speed governor 20. Meanwhile, the mode of the change in position that occurs in the band-shaped glass film 1 is not limited to the above-mentioned mode, and the change in position may instantaneously occur in a partial region of the band-shaped glass film 1 due to the occurrence of wrinkles or the like. In each of FIG. 3A and FIG. 3B, there is illustrated a state in which such change in position occurs only in a region facing the detection unit 21. In FIG. 3A, there is illustrated a case in which a central portion 1' in the width direction of the band-shaped glass film 1 bulges toward the slack side. In FIG. 3B, there is illustrated a case in which the central portion 1' in the width direction of the band-shaped glass film 1 bulges toward the tension side.

The partial and instantaneous changes in position of the band-shaped glass film 1 illustrated in FIG. 3A and FIG. 3B do not cause serious problems from the viewpoint of the conveyance stability of the band-shaped glass film 1 even when the changes in position are left unaddressed. However, in the existing speed governor 20, in response to an instantaneous change in position of the band-shaped glass film 1, the conveyance speed V1 of the upstream side conveyance device (first conveyor 10) is abruptly changed so as to eliminate the change in position. As a result, in response to this change, each of the conveyance speeds V2, V3, and Vw of the downstream side conveyance devices (second conveyor 11, third conveyor 12, and roll-up device 14) is also abruptly changed. Accordingly, in the band-shaped glass film 1 conveyed along the horizontal conveyance path R2, an unexpected tensile force is generated, or excessive slack occurs. Because of this, the performance of the cutting and removing step P4 by the cutting device 16 is impaired, or there is a risk in that defects such as fracture of the band-shaped glass film 1 may be caused.

The speed governor 20 improved in order to solve such defects is described below.

The speed governor 20 after the improvement includes the detection unit 21 and the control unit 22 in the same manner as in the speed governor 20 before the improvement. Through change of software to be stored in the control unit 22, the speed governor 20 can be improved.

In the speed governor 20 after the improvement, the correction process for the conveyance speed V1 of the first conveyor 10 on most upstream is the same as that of the speed governor 20 before the improvement. That is, the conveyance speed V1 of the first conveyor 10 is corrected based on the detection data in the detection unit 21 so that the change in position of the band-shaped glass film 1 is eliminated. The conveyance speed V1 thus determined is hereinafter referred to as "corrected conveyance speed".

In determination of the conveyance speeds V2, V3, and Vw of the downstream side conveyance devices 11, 12, and 14, first, a specified speed range to be the basis for calculation is set. The specified speed range is a range having a width with, as the center, the conveyance speed V1 (reference speed) of the first conveyor 10 when a change in position has not occurred in the band-shaped glass film 1 (state indicated by the solid line in each of FIGS. 2A and 2B). It is preferred that a ratio X of an upper limit value to a lower limit value (upper limit value/lower limit value) of the range be set so as to satisfy a relationship of $1<X<1.2$, preferably $1<X<1.1$, more preferably $1<X<1.05$, most preferably $1<X<1.03$. For example, when the band-shaped glass film has a thickness of 50 μm, and the glass flow rate is 200 kg/h, the reference speed is set to 12.4 m/min, the upper limit value of the specified reference speed range is set to 12.8 m/min, and the lower limit value of the specified-reference speed range is set to 12.0 m/min.

Next, in the control unit 22, determination is made on whether or not the corrected conveyance speed V1 of the first conveyor 10 falls within the above-mentioned specified reference speed range. When the corrected conveyance speed V1 falls within the specified reference speed range, the conveyance speeds V2, V3, and Vw of the respective conveyance devices 11, 12, and 14 are corrected by multiplying the corrected conveyance speed V1 by each of the coefficients α unique to the downstream side conveyance devices 11, 12, and 14. That is, the correction is made as follows:

$$V2 = V1 \times \alpha 2$$

$$V3 = V1 \times \alpha 3$$

$$Vw = V1 \times \alpha w$$

The conveyance speeds (V2, V3, and Vw) obtained by this correction are the same values as those of the conveyance speeds obtained through control by the speed governor 20 before the improvement. As the coefficient α, the same coefficient as the coefficient α used in the speed governor 20 before the improvement may be used, and it is preferred to set the coefficient to the relationship of $\alpha 2 < \alpha 3 < \alpha w$.

Meanwhile, when the corrected conveyance speed V1 of the first conveyor 10 is out of the above-mentioned specified speed range, the conveyance speeds V2, V3, and Vw of the respective conveyance devices 11, 12, and 14 are corrected by multiplying the upper limit value or the lower limit value of the specified speed range by the coefficient α. That is, the correction is made so as to satisfy the following expression.

Conveyance speed($V2, V3$, or $Vw$)=upper limit value or lower limit value×α

Specifically, when the corrected conveyance speed V1 is more than the upper limit value of the specified speed range, the correction is made as follows:

$$V2 = \text{upper limit value} \times \alpha 2$$

$$V3 = \text{upper limit value} \times \alpha 3$$

$$Vw = \text{upper limit value} \times \alpha w$$

When the corrected conveyance speed V1 is less than the lower limit value of the specified speed range, the correction is made as follows:

$$V2 = \text{lower limit value} \times \alpha 2$$

$$V3 = \text{lower limit value} \times \alpha 3$$

$$Vw = \text{lower limit value} \times \alpha w$$

The foregoing means that an upper limit and a lower limit are set to each of the conveyance speeds (V2, V3, and Vw) of the downstream side conveyance devices 11, 12, and 14.

Figure 6:
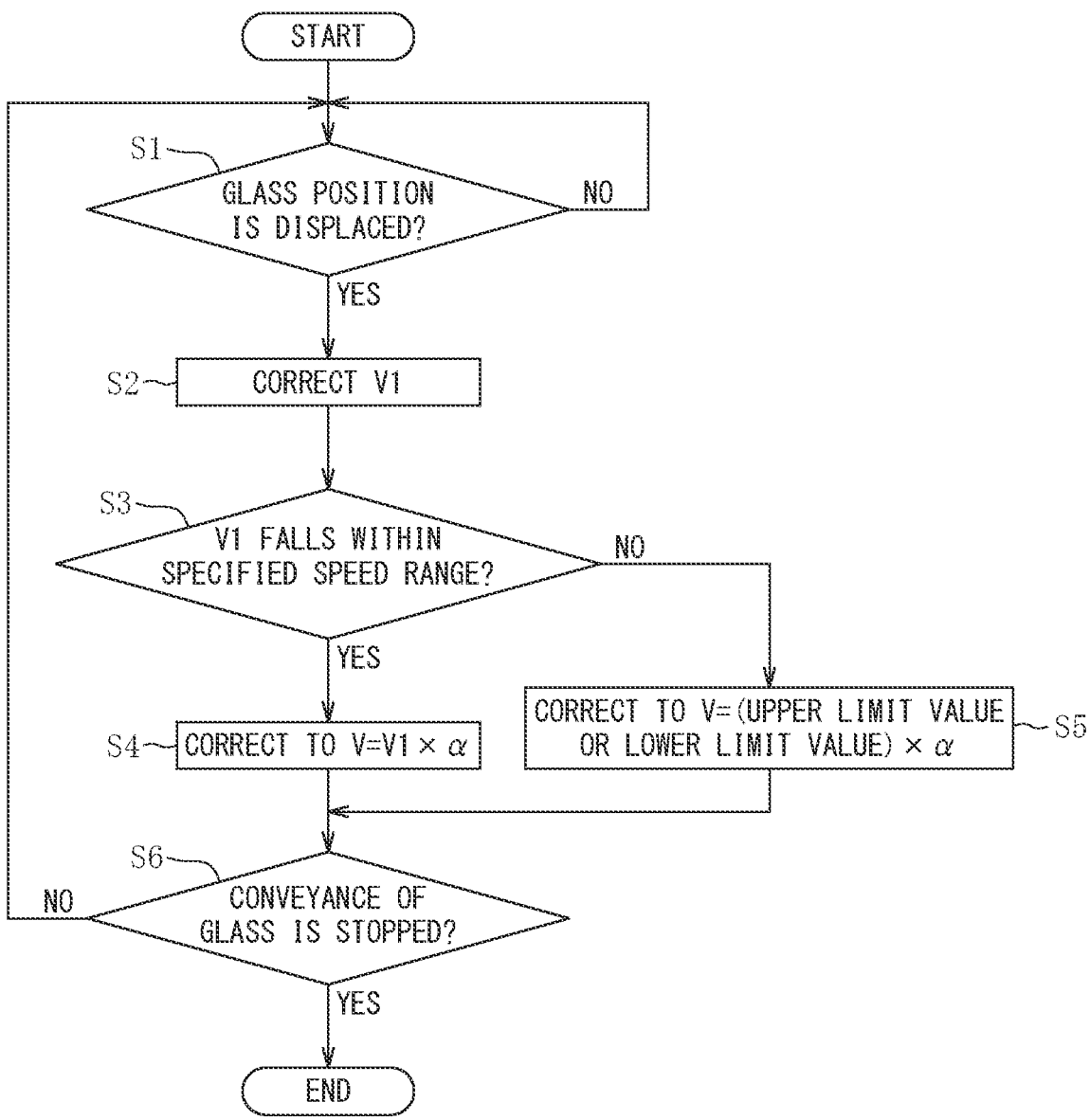
FIG. 6 is a flowchart of control to be performed in a control unit of the improved speed governor.

In FIG. 6, there is illustrated a flowchart of control to be performed in the control unit 22 of the speed governor 20 after the improvement described above. In FIG. 6, V1 represents the conveyance speed of the upstream side conveyor (first conveyor 10). Note that V collectively represents the conveyance speeds V2, V3, and Vw of the downstream side conveyors (second conveyor 11, third conveyor, and roll-up device 14).

As illustrated in FIG. 6, first, determination is made, from the detection data in the detection unit 21, on whether or not the position of the band-shaped glass film 1 has been displaced (S1). When the band-shaped glass film 1 has been displaced (YES), V1 is corrected so as to eliminate this displacement (S2). When the band-shaped glass film 1 has not been displaced (NO), the flow is returned to the start. Next, determination is made on whether or not the corrected V1 falls within a specified speed range (S3). When the corrected V1 falls within the specified speed range (YES), the conveyance speed V of each of the downstream side conveyance devices 11, 12, and 14 is corrected so as to satisfy an expression of V=V1×a (S4). When the corrected V1 is out of the specified speed range (NO), the conveyance speed V is corrected so as to satisfy an expression of V=upper limit value or lower limit value×a (S5). Next, determination is made on whether or not the conveyance of the band-shaped glass film 1 has been stopped in the entire manufacturing line (S6). When the conveyance has been stopped (YES), the control is finished. When the conveyance has not been stopped (No), the flow is returned to the start.

Figure 4:
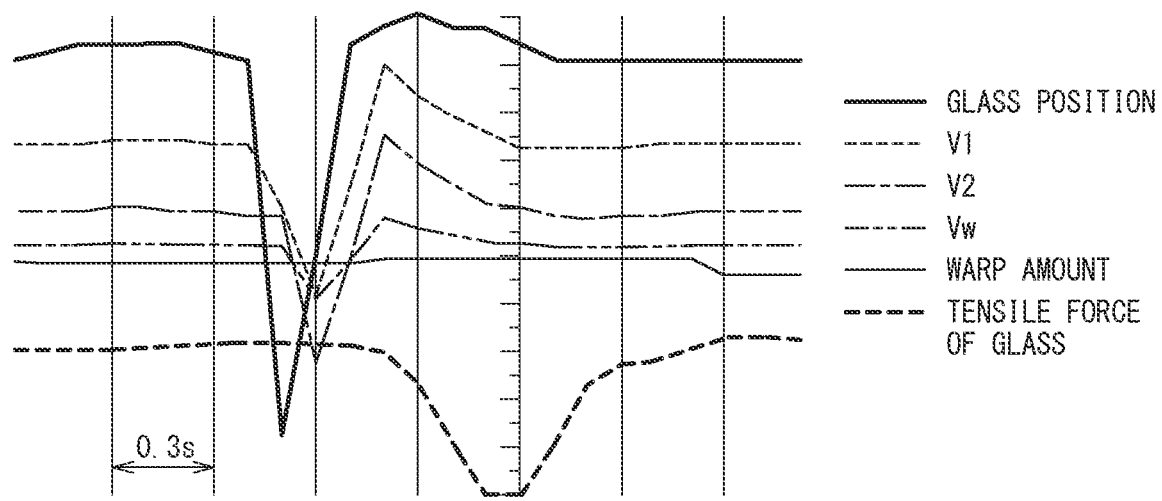
FIG. 4 is a diagram for showing various measurement data when the band-shaped glass film is manufactured through use of an existing speed governor.
Figure 5:
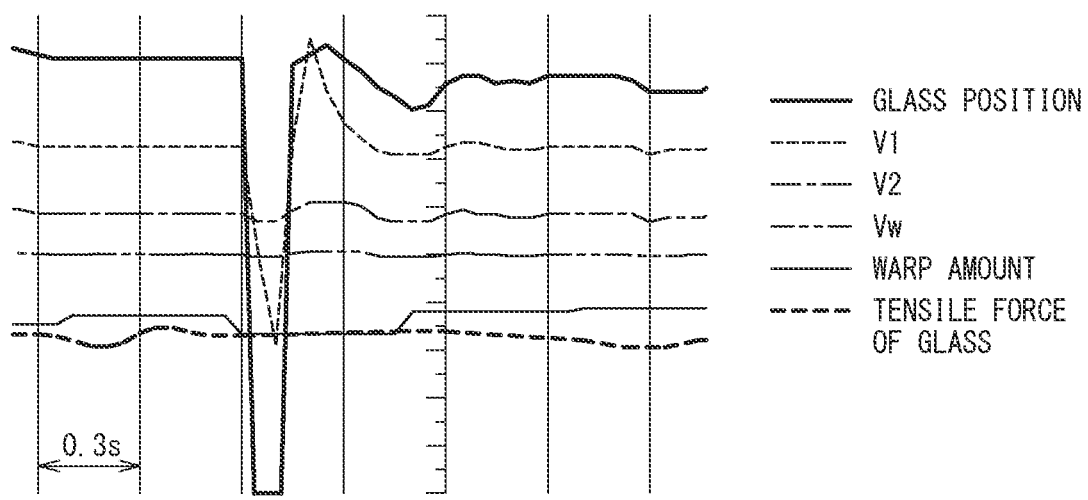
FIG. 5 is a diagram for showing various measurement data when the band-shaped glass film is manufactured through use of an improved speed governor.

In FIG. 4, there are shown various measurement data when the band-shaped glass film 1 is manufactured through use of the speed governor 20 before the improvement. In FIG. 5, there are shown various measurement data when the band-shaped glass film 1 is manufactured through use of the speed governor 20 after the improvement. In each of FIG. 4 and FIG. 5, the horizontal axis represents an elapsed time, and one scale on the horizontal axis represents 0.3 second. The thick solid line indicates the position of the band-shaped glass film 1 detected by the detection unit 21, and indicates that the band-shaped glass film 1 is closer to the detection unit 21 toward a lower part of the figure. The thin broken line indicates the conveyance speed V1 of the first conveyor 10. The alternate long and short dash line indicates the conveyance speed V2 of the second conveyor 11. The alternate long and two short dashes line indicates the conveyance speed Vw of the roll-up device 14. Each of the lines indicates that the conveyance speed is lower toward the lower part of the figure. In addition, the thin solid line indicates a maximum slack amount (maximum warp amount) in the slack section 17, and indicates that the slack amount is smaller toward the lower part of the figure. The thick broken line indicates the tensile force that acts on the band-shaped glass film conveyed by the second conveyor 11, and indicates that the tensile force is smaller toward the lower part of the figure.

In the case of using the speed governor 20 before the improvement, as is apparent from FIG. 4, when the glass position instantaneously approaches the detection unit 21, the conveyance speed V2 of the second conveyor 11, the conveyance speed V3 of the third conveyor 13, and the conveyance speed Vw of the roll-up device 14, as well as the conveyance speed V1 of the first conveyor 10, are instantaneously decreased significantly. As a result, the tensile force that acts on the band-shaped glass film 1 is instantaneously decreased, and, for example, defects such as the difficulty in cutting operation in the cutting and removing step P4 are caused. Contrary to FIG. 4, when the glass position instantaneously moves away from the detection unit 21, the conveyance speed V2 of the second conveyor 11, the conveyance speed V3 of the third conveyor 12, and the conveyance speed Vw of the roll-up device 14 are increased, and hence the tensile force that acts on the band-shaped glass film 1 is increased. Thus, there is a concern about fracture and the like of the band-shaped glass film 1.

Meanwhile, in the case of using the speed governor 20 after the improvement, as is apparent from FIG. 5, when the glass position is instantaneously changed, the conveyance speed V1 of the first conveyor 10 is changed significantly. However, the conveyance speeds of the other conveyance devices (second conveyor and roll-up device) are hardly changed, and the tensile force that acts on the band-shaped glass film 1 is hardly changed. Thus, the conveyance stability of the band-shaped glass film 1 can be enhanced. With this configuration, stagnation of the cutting and removing step P4 and defects such as fracture of the band-shaped glass film 1 can be avoided.

In the above description, description has been given of the case in which the four conveyance devices (first conveyor 10, second conveyor 11, third conveyor 12, and roll-up device 14) are arranged in the horizontal conveyance path R2. However, the number of the conveyance devices to be arranged in the horizontal conveyance path R2 may be suitably changed. Even when three or less or five or more conveyance devices are arranged, the conveyance speed of each of the conveyance devices can be controlled through use of the speed governor 20 after the improvement described above.

In addition, as a method of forming the band-shaped glass film 1, it is also possible to adopt a float method in which the band-shaped glass film is drawn from a float bath and conveyed by a horizontal conveyance portion.

REFERENCE SIGNS LIST

1 band-shaped glass film
10 first conveyor (upstream side conveyance device)
11 second conveyor (downstream side conveyance device)
12 third conveyor (downstream side conveyance device)
14 roll-up device (downstream side conveyance device)
16 cutting device
20 speed governor
21 detection unit
22 control unit
P1 forming step
P2 conveyance direction changing step
P3 horizontal conveyance step
P4 cutting and removing step
R1 curved conveyance path
R2 horizontal conveyance path

The invention claimed is:

1. A method of manufacturing a band-shaped glass film, the method comprising:
a forming step of forming a band-shaped glass film while drawing the band-shaped glass film downward in a vertical direction;
a conveyance direction changing step of changing a conveyance direction of the band-shaped glass film from a vertically downward direction to a horizontal direction by conveying the formed band-shaped glass film along a curved conveyance path; and
a horizontal conveyance step of conveying the band-shaped glass film, which has been changed in conveyance direction by the curved conveyance path, in the horizontal direction by a plurality of conveyance devices arranged along a horizontal conveyance path,
wherein a state of the band-shaped glass film conveyed downward in the vertical direction is detected by a detection unit, and a conveyance speed of each of the plurality of conveyance devices is controlled based on detection data in the detection unit by a speed governor,
wherein, under a condition that, of the plurality of conveyance devices, a conveyance device of the plurality of conveyance devices located on a most upstream side is defined as an upstream side conveyance device, and a conveyance device of the plurality of conveyance devices on a downstream side of the upstream side conveyance device is defined as a downstream side conveyance device, an upper limit and a lower limit are set to the conveyance speed of the downstream side conveyance device,
wherein a conveyance speed V1 of the upstream side conveyance device is corrected from a reference speed based on the detection data in the detection unit,
wherein determination is made on whether or not the conveyance speed V1 of the upstream side conveyance device after the correction falls within a specified speed range, and
wherein the speed governor comprises a control unit that corrects the conveyance speed of the downstream side conveyance device based on the conveyance speed V1 after the correction when the conveyance speed V1 after the correction falls within the specified speed range, and corrects
the conveyance speed of the downstream side conveyance device to the upper limit or the lower limit based on an upper limit value or a lower limit value within the specified speed range when the conveyance speed V1 after the correction is outside of the specified speed range.

2. The method of manufacturing a band-shaped glass film according to claim 1, wherein a ratio X of the upper limit value to the lower limit value (=upper limit value/lower limit value) within the specified speed range is set to 1.0<X<1.2.

3. The method of manufacturing a band-shaped glass film according to claim 1, further comprising a cutting and removing step of cutting and removing non-effective parts at both ends in a width direction of the band-shaped glass film by a cutting device,
wherein the downstream side conveyance device is a second conveyor configured to supply the band-shaped glass film to the cutting device.

4. The method of manufacturing a band-shaped glass film according to claim 1, wherein the downstream side conveyance device is a roll-up device configured to roll up the band-shaped glass film and is provided at a terminal end of the horizontal conveyance path.

5. The method of manufacturing a band-shaped glass film according to claim 4, wherein the plurality of conveyance devices includes a third conveyor configured to attract and convey the band-shaped glass film, the third conveyor being provided on an upstream side of the roll-up device and a downstream side of the upstream side conveyance device.

6. The method of manufacturing a band-shaped glass film according to claim 1, wherein the downstream side conveyance device includes a plurality of downstream side conveyance devices, and the conveyance speeds of the downstream side conveyance devices are set so as to be increased toward a downstream side conveyance device of the plurality of downstream conveyance devices on a most downstream side.

* * * * *